US007543720B2

(12) United States Patent
Nadel

(10) Patent No.: US 7,543,720 B2
(45) Date of Patent: Jun. 9, 2009

(54) METHOD AND APPARATUS FOR DISPENSING SMALL VOLUMES OF FLUID

(75) Inventor: Arthur Nadel, Huntington Beach, CA (US)

(73) Assignee: The Lee Company, Westbrook, CT (US)

( * ) Notice: Subject to any disclaimer, the term of this patent is extended or adjusted under 35 U.S.C. 154(b) by 303 days.

(21) Appl. No.: 10/838,361

(22) Filed: May 4, 2004

(65) Prior Publication Data

US 2005/0238500 A1    Oct. 27, 2005

Related U.S. Application Data

(60) Provisional application No. 60/467,991, filed on May 5, 2003.

(51) Int. Cl.
*B67B 7/00* (2006.01)
(52) U.S. Cl. .............................. 222/1; 222/61; 222/263; 222/309; 222/504; 422/100
(58) Field of Classification Search ..................... 222/1, 222/4, 52, 61, 63, 181.1, 380, 387, 389, 394, 222/504–505, 544, 547, 481, 548, 420, 422, 222/263, 386.5, 333–334, 309; 417/53–54, 417/118, 100
See application file for complete search history.

(56) References Cited

U.S. PATENT DOCUMENTS

| | | | | |
|---|---|---|---|---|
| 4,360,132 A | * | 11/1982 | Vilagi et al. | 222/504 |
| 4,459,267 A | * | 7/1984 | Bunce et al. | 422/100 |
| 4,572,103 A | * | 2/1986 | Engel | 118/697 |
| 4,941,428 A | * | 7/1990 | Engel | 118/680 |
| 5,022,556 A | * | 6/1991 | Dency et al. | 222/1 |
| 5,074,443 A | * | 12/1991 | Fujii et al. | 222/639 |
| 5,540,562 A | * | 7/1996 | Giter | 417/254 |
| 5,769,615 A | * | 6/1998 | Giter | 417/415 |
| 6,253,957 B1 | * | 7/2001 | Messerly et al. | 222/1 |
| 6,354,471 B2 | * | 3/2002 | Fujii | 222/380 |
| 6,405,810 B1 | * | 6/2002 | Grach et al. | 175/52 |
| 6,484,556 B1 | * | 11/2002 | Jabobs et al. | 73/1.74 |
| 6,564,968 B1 | * | 5/2003 | Terrell et al. | 222/63 |
| 6,610,364 B1 | * | 8/2003 | Kweon et al. | 427/256 |
| 6,676,408 B1 | * | 1/2004 | Bushnell et al. | 433/36 |
| 6,824,023 B2 | * | 11/2004 | Kim et al. | 222/504 |
| 7,169,616 B2 | * | 1/2007 | Johnson et al. | 436/180 |

* cited by examiner

*Primary Examiner*—Frederick C. Nicolas
(74) *Attorney, Agent, or Firm*—Philip J. Lee

(57) ABSTRACT

A method and apparatus for dispensing small volumes of fluid using a pneumatic control valve connected to the intake port of a pump having a chamber of variable volume, connecting the outlet port of the pump to the inlet port of a high speed flow control valve and a long, small diameter nozzle to the outlet port of the flow control valve, to aspirate a fluid to be dispensed into a long, small diameter nozzle by closing the pneumatic control valve, opening the flow control valve and partially expanding the volume of the pump chamber, then closing the flow control valve and further expanding the volume of the pump chamber to increase the gaseous volume within the pump chamber, pressurizing the gas within the pump chamber by closing the pneumatic control valve and reducing the volume of the pump chamber, finally dispensing a measured amount of fluid by briefly opening the flow control valve for a measured time to allow controlled amounts of fluid to be dispensed through the nozzle.

5 Claims, 1 Drawing Sheet

METHOD AND APPARATUS FOR DISPENSING SMALL VOLUMES OF FLUID

CROSS REFERENCE TO RELATED PROVISIONAL APPLICATION

This application claims the benefit of U.S. Provisional Application No. 60/467,991, filed May 5, 2003.

BACKGROUND OF THE INVENTION

A. Field of Invention

The present invention relates generally to methods and apparatus for dispensing small volumes of fluid and more particularly to a new and improved method of dispensing very small volumes of fluid by means of an apparatus comprised of known and available fluid control components in a novel arrangement.

B. Description of Related Art

In systems requiring a means of dispensing extremely small amounts of fluid, limitations of size, external plumbing, and economics of precision metering equipment limit the usefulness of common solutions. For example, direct use of a simple dispensing pump to push a small volume out a nozzle requires the pump to perform a very limited operation. For example, a simple displacement pump must operate either an extremely small physical component or to move a component through a very short or small range of motion to achieve a volume differential small enough to result in the accurate dispensing of a small volume of fluid. In many applications in which such small volumes of fluid are desired, the allowable margin of error may be difficult to achieve due to normal pump operation variances. One method of avoiding such error is to supply a constant pneumatic pressure to a fluid system and interpose a fast acting flow control valve between the pressure source and a nozzle, whereby opening the valve for a brief time allows limited flow to a nozzle and thus dispensing a small volume of fluid. In some applications however, supplying pneumatic pressure to an array of nozzles can be cumbersome and may not allow use in applications where space is limited. Therefore, there is a need for a compact and self contained means for dispensing minute volumes of fluid, and a method of utilizing existing devises to achieve said function is desirable and needed.

SUMMARY OF THE INVENTION

The method of the present invention comprises assembling existing components into a system comprising a gas flow control valve, a variable displacement pump, a fast acting flow control valve and a nozzle. The variable displacement pump comprises an inlet port, an outlet port, a pump chamber and a means, for example a piston, for controllably altering the volume of the chamber in discrete increments. While a more common arrangement uses check valves at the inlet and outlet of the pump, which causes the pump to draw fluid into the chamber from the inlet port and force fluid out the outlet port, the system of the present invention uses at both the inlet and at the outlet a simple valve that either prevents flow in both directions or permits flow in either direction. The inlet port is vented to the atmosphere or other gas source. Accordingly, when the outlet valve is closed and the inlet valve is open, increasing the volume of the chamber caused gas intake from the inlet, and opening the inlet valve allows gas to escape from the chamber. The outlet valve is interposed between the pump and the nozzle and the pump does not operate as a flow through device, but takes up the fluid to be dispensed and dispenses the same fluid through the nozzle.

The method of the present invention consists of operating the system by reducing the pump chamber to a minimal volume and then with the inlet valve closed and the outlet valve open, a desired amount of buffer solution is drawn into the nozzle by increasing the chamber volume. Then the nozzle is placed in the fluid to be dispensed and a desired amount of that fluid is drawn into the nozzle by further increasing the chamber volume. If the initial volume of the chamber was filled with gas by expelling all fluid and opening the inlet valve, the next step may proceed with pressurization, and if not or if additional gas volume is desired, then next the outlet valve is closed and the inlet port is opened while the pump chamber volume is again further increased, thereby drawing gas into the pump chamber. Both valves are then closed and the pump chamber volume is decreased, thereby increasing the pressure within the chamber and compressing the gaseous volume in the chamber. Finally, a brief opening of the outlet valve then causes a determined amount of dispensate to be dispensed through the nozzle. Within a particular system, the volume dispensed is dependent on the pressurization of the gas within the pump and the length of time that the outlet valve is open. Systemic variations in performance can be readily achieved by modifying the nozzle configuration or buffer viscosity. While the system can be used to dispense larger volumes, it is anticipated that a primary advantage of the method is the ability to dispense extremely small volumes and for that purpose a relatively long nozzle is used with a small inside diameter.

In the preferred embodiment, the outlet valve is a very high speed, solenoid actuated flow control valve and the nozzle is relatively long with a small inside diameter. A useful pump would be of the type using a volume displacing member actuated by a step drive to incrementally vary the internal volume of a pump chamber. In the specifically anticipated application of the present invention, with desired volumes of dispensate are droplets, small enough to be measured in the nanoliters. The volume of the droplets that can be dispensed may be smaller than could be accurately dispensed using the pump alone. It is further anticipated that the volume to be dispensed may be less than the interior volume of the nozzle, and accordingly, the dispensate would not be required to enter the outlet valve, thereby allowing a purging of the dispensate if desired and avoidance of contamination. Although it is anticipated that the use of a buffer solution provides many advantages, the system could be operated with only use of a fluid to be dispensed, if enough is drawn into the system to allow proper functioning of the outlet valve.

The method and apparatus of the present invention requires no external pneumatic pressure source and is self-contained, requiring no external plumbing or tubing. Provided the system is not operated in a vacuum, the system can draw on ambient atmosphere through a valved vent for its pneumatic supply. It is expected that for use with a volatile, chemically active, corrosive or expensive reagent as a dispensate, a buffer solution may be advantageously employed as the primary fluid in the system. The use of a buffer solution will also allow a wash cycle to flush the system of contaminates or unused dispensate. In the event a buffer solution is used, only so much of the dispensate as slightly exceeds the volume to be dispensed need be aspirated.

The principle aim of the present invention is to provide a new and improved fluid dispensing system that meets the foregoing requirements and is capable of accurate dispensing less than microliter volumes.

Another and further object and aim of the present invention is to provide a new and improved fluid dispensing system that meets the foregoing requirements and which is assembled of available components.

Another and further object and aim of the present invention is to provide a new and improved fluid dispensing system that meets the foregoing requirements and which is economical to manufacture, maintain and operate.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction and method as hereinafter described.

Figure 1:
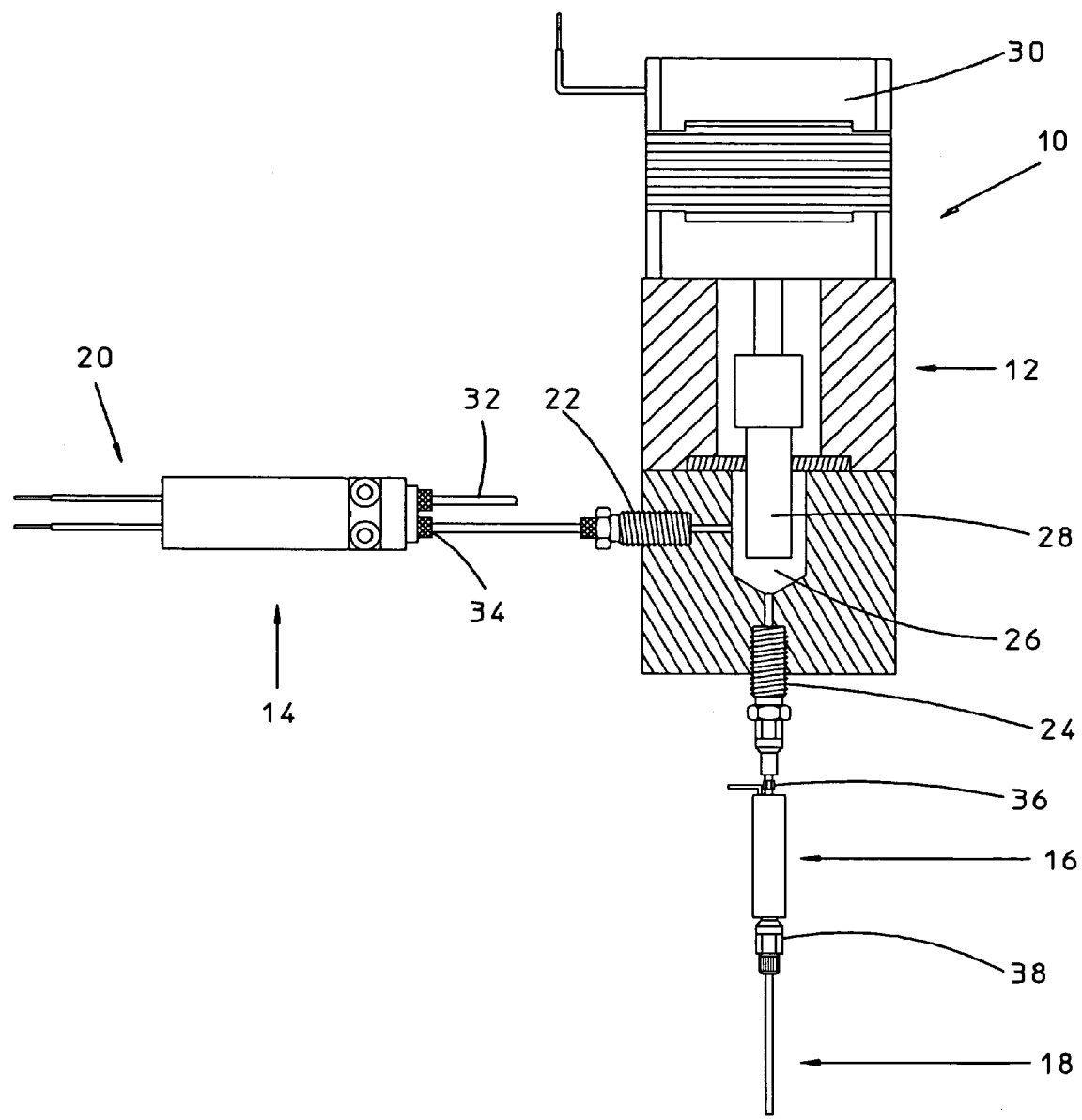
FIG. 1 is a plan view of a preferred embodiment of system in accord with the present invention, showing a longitudinal section view of the pump component thereof.

DESCRIPTION OF THE PREFERRED
EMBODIMENT(S)

With reference to the Drawing wherein like numerals represent like parts, a dispensing system constructed in accordance with the method of the present invention is generally designated by numeral 10 in FIG. 1. The method of the present invention comprises assembling and operating dispensing system 10 comprising a pneumatic intake valve 14, a variable volume pump 12, a fast acting flow control valve 16 and a nozzle 18. Variable volume pump 12 comprises an inlet port 22, an outlet port 24, a pump chamber 26 and a means for controllably altering the volume of pump chamber 26 in discrete increments, which in the illustrated preferred embodiment consists of a piston 28. It will be noted that although pump 12 is describes as such herein, pump 12 departs from normal pump configuration by the lack of one directional valving, such as a check valve at the outlet port; pump 12 having only a variable chamber 26. In the preferred embodiment, outlet valve 16 is a very high speed, solenoid actuated flow control valve having an inlet port 36 and an outlet port 38, and is capable of rapid opening and remaining open for short intervals. An example of a suitable valve 16 is the valve described in U.S. Pat. No. 5,085,402 to O'Dell driven by a spike and hold drive circuit such as that shown in U.S. Pat. No. 5,422,780 to Lignar. It is to be understood that the valve 16 contains a means for controllably either preventing or allowing flow between inlet port 36 and outlet port 38, such means not being shown as there are a variety of such valves available. Nozzle 18 is relatively long with a small inside diameter, an example of a suitable inside diameter being 0.005 inch. Pump 12 uses a volume displacing piston member 28 actuated by a step drive 30 to protrude into or be retracted from pump chamber 26, and thereby incrementally vary the internal volume of pump chamber 26. Pneumatic intake valve 14 is a gas flow control valve with an inlet port 32, an outlet port 34, and means for controlling gas flow therebetween (not shown for the same reasons as relate to valve 16). The system components are serially assembled with the inlet port 32 of pneumatic intake valve 14 vented to the atmosphere, intake valve outlet port 34 connected to the pump inlet port 22, pump outlet port 24 connected to the outlet valve inlet port 36, and the outlet valve outlet port 38 connected to one end of nozzle 18.

As an example and not a limitation, a system 10 comprising a pump 12 with pump chamber 26 volume of approximately 325 microliters and piston 28 capable of displacing approximately 250 microliters, a nozzle 18 with internal volume of 17 microliters, with outlet valve 16 capable of opening for 0.125 seconds can be used with the method of the present invention to dispense 0.1 microliter amounts.

The method of the present invention comprises operating system 10 by pressurizing a volume of gas within pump chamber 26 after aspirating a desired amount of fluid to be dispensed and then briefly opening the outlet valve 16. One embodiment of the method starts with the valve chamber 26 reduced and filled with air by opening the intake valve 14, which is then closed, thereby obtaining about 75 microliters of air within the chamber 26. Retraction of piston 28, increasing the volume of chamber 26 while nozzle 18 is in a source of fluid to be dispensed and the outlet valve 16 is open results in the aspiration of a measured amount of fluid. In the event a buffer solution as well as a dispensate fluid are used the aspiration step may be performed twice. Subsequent extension of piston 28 into chamber 26, while valves 14 and 16 are closed, reduces the volume of chamber 26, which will be expected to compress the gas within chamber 26 and pressurize with the system 10. The conclusion of a cycle of the present method is accomplished by the brief opening of the outlet valve 16 for a determined interval sufficient to cause the desired amount of fluid to be dispensed through nozzle 18. If, for example only, the pressure within the chamber 26 is increased to 5.5 PSIG and the valve 16 is opened for 0.125 seconds, it is expected that 0.1 microliters will be dispensed. Alternately, after a desired amount of fluid is drawn into system 10 through nozzle 18, outlet valve 16 can be closed and intake valve 14 opened while the pump chamber volume is again further increased, thereby drawing gas into the pump chamber 26.

System 10 can draw on ambient atmosphere through valve 14 for its pneumatic supply; a pressurized gas supply to valve 14 would eliminate or modify the step of pressurizing the gas within the pump chamber 26. It is expected that for use with a volatile, chemically active, corrosive or expensive reagent as a dispensate, a buffer solution may be advantageously employed as the primary fluid in the system. The use of a buffer solution will also allow a wash cycle to flush the system of contaminates or unused dispensate. In the event a buffer solution is used, only so much of the dispensate as slightly exceeds the volume to be dispensed need be aspirated. Under expected circumstances, it is expected that it would be preferable to operate the system 10 in an "upright" orientation with the pump 12 higher than the nozzle 18 to prevent undesired leakage of buffer or dispensate into the pump chamber 26. It will be anticipated that such leakage can be prevented in other ways, and that the change in gaseous volume within pump chamber 26 resulting from leakage can be accounted and adjusted for.

It will further be anticipated that the specific performance of the system 10, used in the method of the present invention can be varied by the modification of a number of variables, such as the viscosity of the fluids used and the predispensing gas pressure, the fluid resistance presented by the nozzle configuration, and the duration of the opening of the outlet valve 16. Adjustment of or for these variables to achieve the desired volume of dispensed fluid is a matter of ordinary calculation; although adjustment for flow characteristics of particular valves and extreme precision in dispensing may require further operational adjustments.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

I claim:

1. A method of dispensing small amounts of fluid comprising the steps of first assembling a system comprising a nozzle having a source end and a dispensing end, a pump device having an inlet port, an outlet port, and a chamber of variable volume therebetween with means for controllably varying the volume of said chamber, a pneumatic control valve connected to the inlet port of said pump device and a flow control valve connected between the outlet port of the pump device and the source end of the nozzle; and inserting the dispensing end of the nozzle into a source of fluid to be dispensed; and causing a negative pressure within the pump device and exposing the source end of the nozzle to the negative pressure within the pump device, thereby causing aspiration of the fluid to be dispensed into the nozzle; and then creating a positive pressure within the pump device; and then exposing the source end of the nozzle to the positive pressure within the pump device for a predetermined time by opening the flow control valve for the predetermined time, thereby dispensing a controlled amount of the fluid to be dispensed from the nozzle.

2. The method of claim 1 wherein the step of creating a negative pressure within the pump device further comprises the steps of first reducing the volume of the pump device chamber, then closing the pneumatic control valve, opening the flow control valve, and finally increasing the volume of the pump device chamber.

3. The method of claim 2 wherein the step of creating positively pressure within the pump device further comprises the steps of first closing the flow control valve, opening the pneumatic control valve, and increasing the pump device chamber, and then closing the pneumatic control valve, and decreasing the pump device chamber volume.

4. The method of claim 3 wherein the step of aspirating the fluid to be dispensed is preceded by the step of first aspirating a buffer solution into the nozzle.

5. The method of claim 4 wherein the step of dispensing fluid is followed by the step of opening the flow control valve while there exists positive pressure within the pump device expelling the buffer solution from the nozzle.

* * * * *